(12) United States Patent
Blanchard

(10) Patent No.: US 8,457,973 B2
(45) Date of Patent: Jun. 4, 2013

(54) MENU HIERARCHY SKIPPING DIALOG FOR DIRECTED DIALOG SPEECH RECOGNITION

(75) Inventor: Harry Edward Blanchard, Rumson, NJ (US)

(73) Assignee: AT&T Intellectual Propert II, L.P., Atlanta, GA (US)

( * ) Notice: Subject to any disclaimer, the term of this patent is extended or adjusted under 35 U.S.C. 154(b) by 1796 days.

(21) Appl. No.: 11/276,542

(22) Filed: Mar. 4, 2006

(65) Prior Publication Data

US 2007/0208568 A1 Sep. 6, 2007

(51) Int. Cl.
*G10L 15/00* (2006.01)
*G10L 17/00* (2006.01)
*G10L 21/00* (2006.01)
*H04M 1/64* (2006.01)

(52) U.S. Cl.
USPC ........... 704/275; 704/231; 704/246; 704/257; 704/270; 704/270.1; 704/277; 379/88.01; 379/88.03; 379/88.04; 379/88.05; 379/88.06; 379/88.07; 379/88.08; 379/88.09

(58) Field of Classification Search
USPC .............. 704/270, 275, 231, 257, 277, 270.1, 704/246; 379/88.01, 88.03, 88.04, 88.05–88.09
See application file for complete search history.

(56) References Cited

U.S. PATENT DOCUMENTS

| | | | |
|---|---|---|---|
| 6,487,277 B2 * | 11/2002 | Beyda et al. | 379/88.01 |
| 6,731,724 B2 * | 5/2004 | Wesemann et al. | 379/88.16 |
| 7,043,435 B2 * | 5/2006 | Knott et al. | 704/270 |
| 7,143,039 B1 * | 11/2006 | Stifelman et al. | 704/270 |
| 7,177,817 B1 * | 2/2007 | Khosla et al. | 704/257 |
| 7,249,023 B2 * | 7/2007 | Pyle et al. | 704/270 |
| 2003/0105634 A1 * | 6/2003 | Abella et al. | 704/257 |
| 2003/0125958 A1 * | 7/2003 | Alpdemir et al. | 704/275 |
| 2004/0120472 A1 * | 6/2004 | Popay et al. | 379/88.01 |
| 2004/0120483 A1 * | 6/2004 | Buzbee | 379/93.17 |
| 2004/0193403 A1 * | 9/2004 | Creamer et al. | 704/201 |
| 2005/0165607 A1 * | 7/2005 | Di Fabbrizio et al. | 704/256 |
| 2005/0288936 A1 | 12/2005 | Busayapongchai et al. | |
| 2006/0259478 A1 * | 11/2006 | Martin et al. | 707/3 |
| 2007/0077919 A1 * | 4/2007 | Chiarulli et al. | 455/414.1 |

* cited by examiner

Primary Examiner — Paras D Shah

(57) ABSTRACT

A method and a processing device for managing an interactive speech recognition system is provided. Whether a voice input relates to expected input, at least partially, of any one of a group of menus different from a current menu is determined. If the voice input relates to the expected input, at least partially, of any one of the group of menus different from the current menu, skipping to the one of the group of menus is performed. The group of menus different from the current menu include menus at multiple hierarchical levels.

20 Claims, 3 Drawing Sheets

MENU HIERARCHY SKIPPING DIALOG FOR DIRECTED DIALOG SPEECH RECOGNITION

BACKGROUND OF THE INVENTION

1. Field of the Invention

The present invention relates to directed dialog speech recognition systems and more specifically to a system and method for directing a dialog in an interactive speech recognition system and for permitting skipping of menus in a menu hierarchy for users familiar with the interactive speech recognition system.

2. Introduction

Directed dialog speech recognition systems are implemented for automation of customer care applications, as well as other customer applications. A typical directed dialog speech recognition system may replace an older touch tone interactive voice response (IVR) system or a live attendant. Directed dialog speech recognition systems respond to individual words or phrases defined in a grammar. The individual words or phrases are usually prompted in a menu. The system may also prompt a user for yes/no answers to questions, as well as form-filling information, such as, for example, credit card numbers. Calls may also be routed by the system to attendants or alternate destinations.

Other than providing an ability to speak words rather than use touch tones, conventional directed dialog speech recognition systems provide little in terms of user interface improvement over touch tone menu systems. A system which offers many options may have a hierarchical menu structure, such that novice users may be walked through a long list of options in a conceptual manner. However, expert system users may become frustrated when forced to walk through the long list of options.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for managing an interactive speech recognition system is provided. Whether a voice input relates to expected input, at least partially, of any one of a group of menus different from a current menu is determined. If the voice input relates to the expected input, at least partially, of any one of the group of menus different from the current menu, skipping to the one of the group of menus is performed. The group of menus different from the current menu include menus at multiple hierarchical levels.

In a second aspect of the invention, a processing device is provided. The processing device includes an electronic storage component, and at least one processor operatively connected to the electronic storage component. The at least one processor is arranged to determine whether a voice input relates to expected input, at least partially, of any one of a group of menus different from a current menu, and if the voice input relates, at least partially, to the expected input of any one of the plurality of menus different from a current menu, skip to the one of the group of menus different from the current menu. The group of menus different from the current menu include menus at multiple hierarchical levels.

In a third aspect of the invention, a machine-readable medium that has instructions recorded therein for at least one processor is provided. The machine-readable medium includes instructions for determining whether a voice relates to expected input, at least partially, of any one of a group of menus different from a current menu, and instructions for skipping to the one of the group of menus different from the current menu if the voice input is determined to relate, at least partially, to the expected input of any one of the group of menus different from the current menu. The group of menus different from the current menu include menus at multiple hierarchical levels.

In a fourth aspect of the invention, a processing device is provided. The processing device includes means for determining whether a voice input relates to expected input, at least partially, of any one of a group of menus different from a current menu, and means for skipping to the one of the group of menus different from the current menu if the voice input relates to the expected input, at least partially, of any one of the group of menus different from the current menu. The group of menus different from the current menu include menus at multiple hierarchical levels.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Directed Dialog Speech Recognition System

Figure 1:
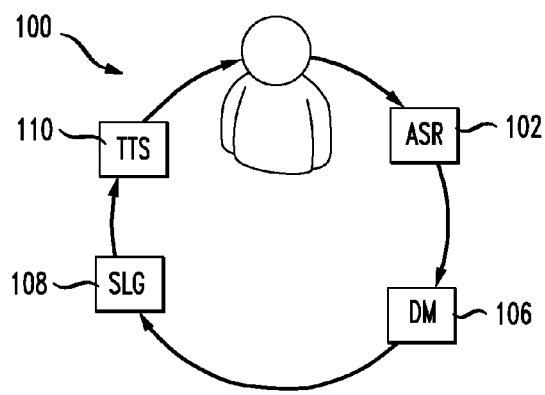
FIG. 1 illustrates an exemplary directed dialog speech recognition system consistent with principles of the invention.

FIG. 1 is a functional block diagram of an exemplary directed dialog speech recognition system 100 consistent with the principles of the invention. Directed dialog speech recognition system 100 may include an automatic speech recognition (ASR) module 102, a dialog management (DM)

module 106, a spoken language generation (SLG) module 108, and a text-to-speech (TTS) module 110.

ASR module 102 may analyze speech input and may provide a transcription of the speech input as output. DM module 106 may receive the transcribed input, may apply a grammar to the transcribed input to analyze a word or group of words that are included in the transcribed input, may determine to which one of a group of menus the speech input is directed, may process the received input and may determine an action, such as, for example, providing a spoken response, based on the input. SLG module 108 may generate a transcription of one or more words in response to the action provided by DM module 106. TTS module 110 may receive the transcription as input and may provide generated audible speech as output based on the transcribed speech.

Thus, the modules of system 100 may recognize speech input, such as speech utterances, may transcribe the speech input, may match the transcribed speech to a grammar, may determine an appropriate response to the speech input, may generate text of the appropriate response and from that text, generate audible "speech" from system 100, which the user then hears. Those of ordinary skill in the art will understand the programming languages and means for generating and training ASR module 102 or any of the other modules in the directed dialog speech recognition system. Further, the modules of system 100 may operate independent of a full dialog system.

FIG. 1 is an exemplary spoken dialog speech recognition system. Other spoken dialog speech recognition systems may include other types of modules and may have different quantities of various modules.

Exemplary System

Figure 2:
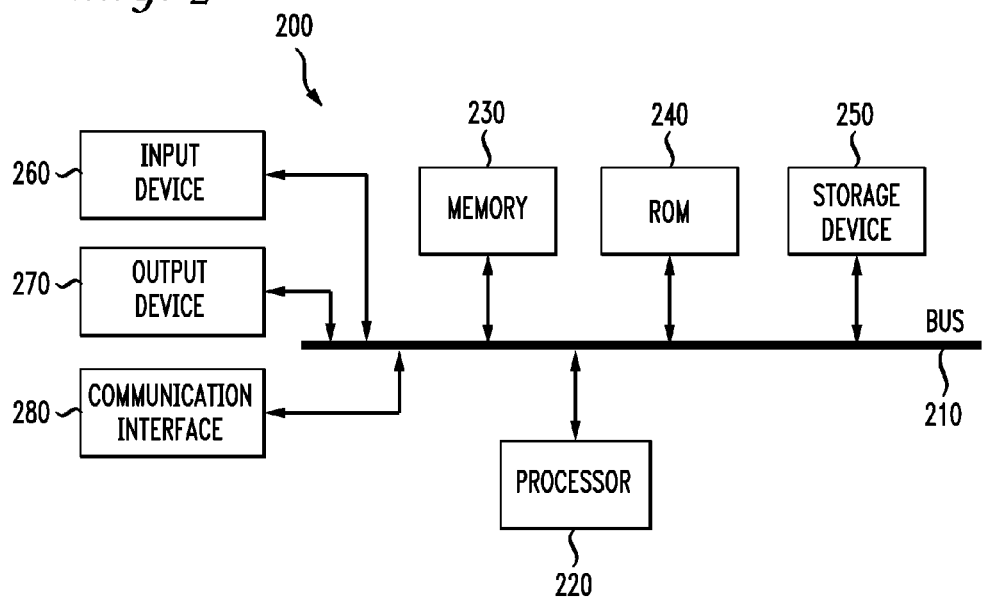
FIG. 2 illustrates an exemplary processing device that may be used to implement one or more components of the exemplary system shown in FIG. 1.

FIG. 2 illustrates an exemplary processing system 200 in which one or more of the modules of system 100 may be implemented. Thus, system 100 may include at least one processing system, such as, for example, exemplary processing system 200. Processing device 200 may include a bus 210, a processor 220, a memory 230, a read only memory (RO 240, a storage device 250, an input device 260, an output device 270, and a communication interface 280. Bus 210 may permit communication among the components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive. Communication interface 280 may include any transceiver-like mechanism that enables processing device 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing device 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Processing device 200 may be, for example, a personal computer (PC), or any other type of processing device capable of processing textual data. In alternative implementations, such as, for example, a distributed processing implementation, a group of processing devices 200 may communicate with one another via a network such that various processors may perform operations pertaining to different aspects of the particular implementation.

In some implementations consistent with the principles of the invention, processing device 200 may receive input via, for example, a wired or wireless telephone line connection and may provide output via the telephone line connection.

Directed Dialog Speech Recognition

A directed dialog speech recognition system may replace a live attendant or a touch tone interactive voice response (IVR) system. Directed dialog systems may respond to individual words or phrases, defined in a grammar. The individual words or phrases may be prompted in a menu, such as, for example, a menu for an express delivery customer application.

Figure 3:
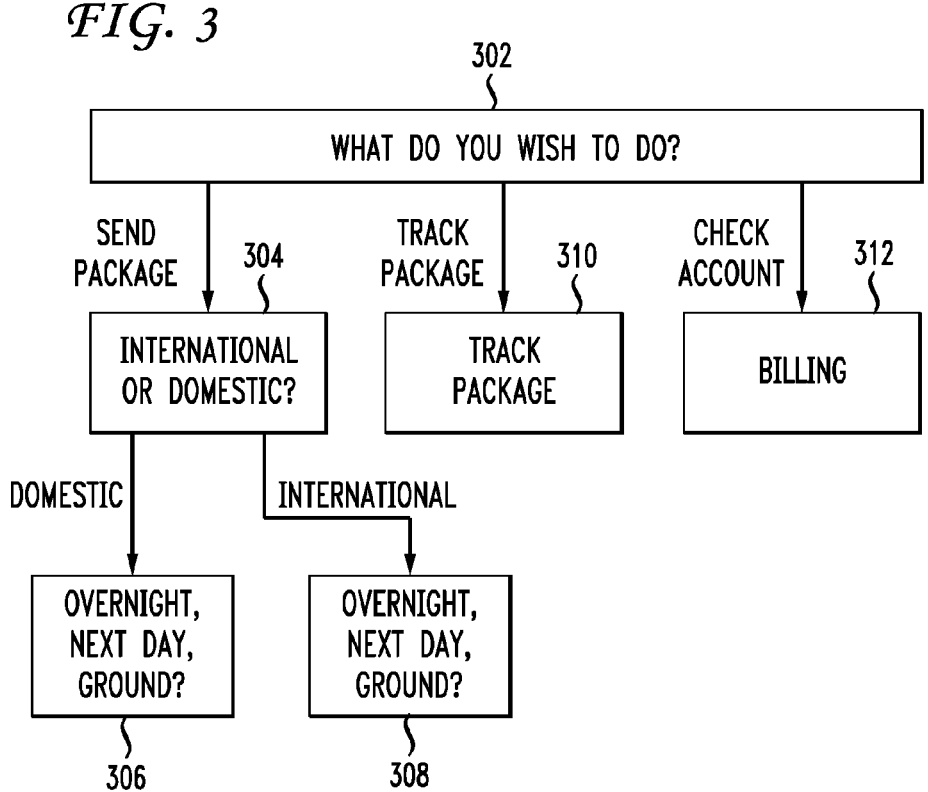
FIG. 3 illustrates a hierarchical menu for an exemplary directed dialog speech recognition system.

FIG. 3 illustrates a hierarchical menu for an exemplary directed dialog speech recognition system that implements an express delivery customer application. First, a user may hear "what do you wish to do, please say 'send package', 'track package', or 'check account'" with respect to main menu 302.

If the user responds with "send package", then the application may proceed to menu 304 and may generate speech for the user asking the user "international or domestic". If the user responds with "domestic", the application may proceed to menu 306 and may generate speech for the user asking "overnight, next day, or ground". If, at menu 304, the user responds with "international", the application may proceed to menu 308 and may generate speech for the user asking "overnight, next day, or ground".

If, at menu 302, the user responds with "track package", the application may proceed to menu 310, and if, at menu 302, the user responds with "check account", the application may proceed to menu 312.

The hierarchical menu structure of FIG. 3 is exemplary. The application may include other prompts or questions for the user, such as, for example, yes/no questions and form-filling questions, such as, for example, "please say your credit card number".

In implementations consistent with the principles of the invention, a single grammar may be used to recognize responses that may apply to any menu in the hierarchical menu structure. In an alternate implementation, some menus or groups of menus may have a slightly different grammar. Non-overlapping key phrases may be chosen for each of the menus in the hierarchy. In one implementation, progressive elaborations of a phrase may be used. For example, the exemplary express delivery customer application may use progressive elaborations of the phrase "send package", such as, "send domestic package", "send international package", "send domestic package overnight", "send domestic package next day", "send domestic package ground", "send international package overnight", "send international package next day", and "send international package ground". In other implementations, direct phrases may be used instead of progressive elaborations of a phrase. Thus, in implementations consistent with the principles of the invention, the user may be prompted for a subset of responses, such as responses that apply to a current menu, although the user may reply with a response that may apply to any of the menus. Further, the user may respond with a portion of a key phrase. For example, using the exemplary express delivery customer application, a user may respond with "overnight" and the application may prompt the user for additional information, such as, "do you want to send an overnight package international or domestic".

Implementations consistent with the principles of the invention may permit users to skip menu prompting by, for example, responding to a prompt with a key phrase associated with another menu. For example, with reference to FIG. 3, if the user responds to a prompt associated with menu 302 with "send domestic package overnight", the application may perform an action associated with sending an overnight domestic package. If the user responds to the prompt associated with menu 302 by saying "send international package", the application may skip to menu 308 and may prompt the user with generated speech saying "overnight, next day, ground".

Implementations consistent with the principles of the invention may provide a tutorial to a user who is determined to be a non-expert. In such implementations, the user's behavior may be recorded. In one implementation, if the user is determined to not have used a keyword or key phrase associated with a menu other than the current menu, then the user may be considered a non-expert. In another implementation, the application may keep a dynamic record of menu traversal in real time and may provide a tutorial based upon the path traversed. For example, if the dynamic record of menu traversal indicates that the user traversed menus inefficiently, such as, traversing menus and then backtracking to another menu before reaching a final menu, or traversing menus very slowly, then the user may be considered a non-expert and the system may provide a tutorial. For example, a user, who the application considers to be a non-expert user, sending an overnight international package may receive a tutorial of "next time, say 'send international package overnight' after the first prompt". A user who the application considers to be an expert user may not be presented with a tutorial.

In other implementations consistent with the principles of the invention, the system may accommodate a corrected phrase. For example, if the user says a phrase, such as, for example, "oh no, I meant to say check account", or "no, I want check my account", the system may recognize a keyword or phrase, for example, "check account", and may skip to the proper menu or take appropriate action (i.e., present the user's account balance).

Exemplary Process

Figure 4:
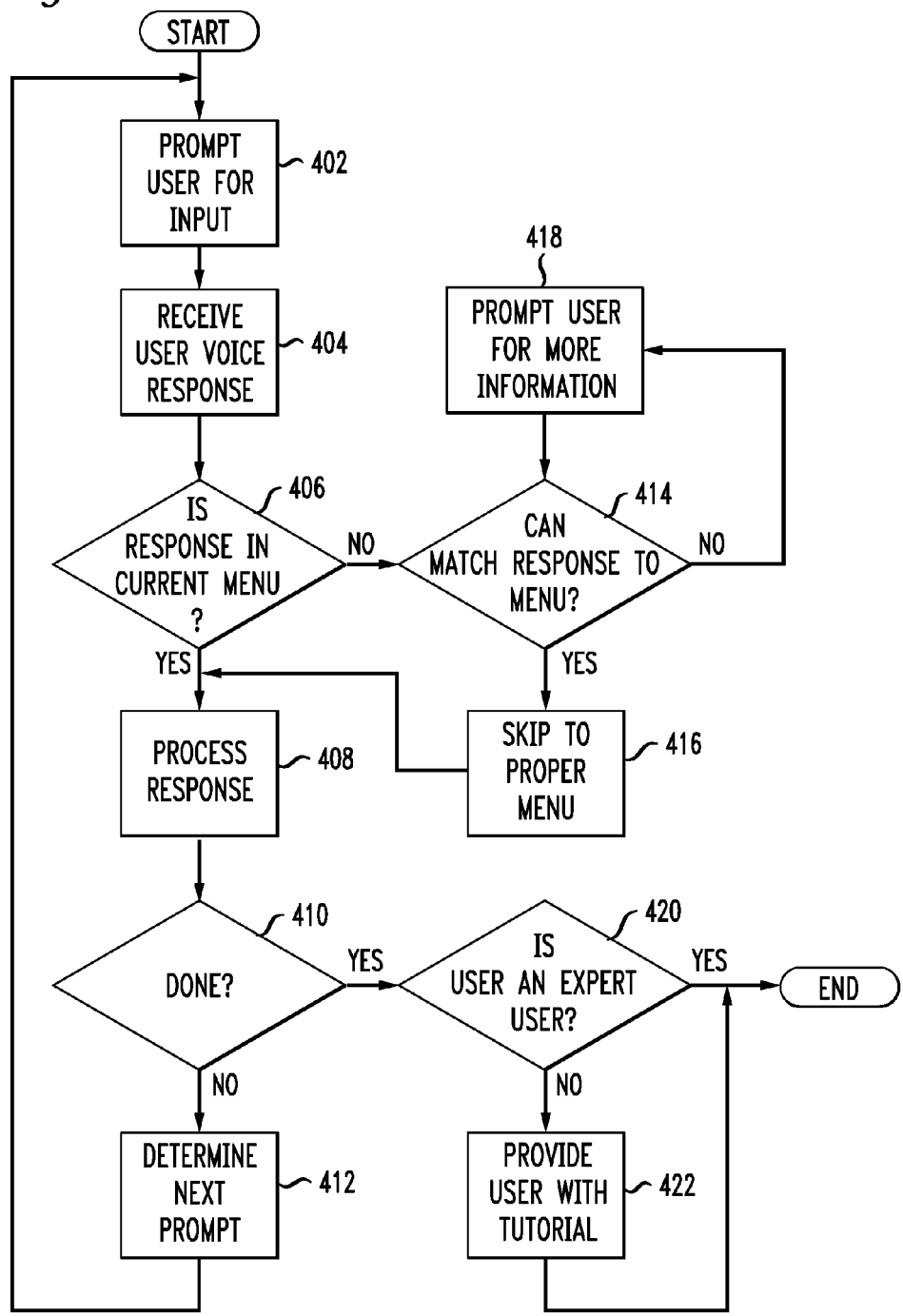
FIG. 4 is a flowchart that illustrates an exemplary process that may be used in implementations consistent with the principles of the invention.

FIG. 4 is a flowchart of an exemplary process that may be used in implementations consistent with the principles of the invention. The process may begin by DM module 106 informing SLG module 108 to send text, corresponding to a prompt, to TTS module 110, which may perform a text-to-speech operation to generate a speech prompt, such as, for example, "what do you want to do", to a user (act 402). The user may hear the prompt and may verbally respond to the prompt. The verbal response may be converted to text by ASR module 102 and the text passed to DM module 106 (act 404).

DM module 106 may receive the text of the user's response and may determine whether the response matches a keyword or key phrase associated with the current menu (act 406). If the response is determined to match a keyword or key phrase associated with the current menu, then DM module 106 may process the response (act 408). Processing the response may include performing a final action, such as, for example, providing account information for an account, providing tracking information for a package, etc. Next, DM module 106 may determine whether the user's request is completed, i.e., whether a final action was performed (act 410). If the user's request is not completed, the DM module 106 may determine which menu is next (act 412) and may perform acts 402-0410 again.

If, at act 410, DM module 106 determines that the user's request is completed, then DM module 106 may determine whether the user is an expert user (act 420). In one implementation, this may be performed by determining whether a skip was performed based on user input. In another implementation, this may be performed by tracking and recording which of the menus DM module 106 traverses based on the user's input and may further track a length of time spent within each menu. Based on recorded tracking information, DM module 106 may determine whether the user traversed a particular track and then backtracked, whether the user spent an unusual amount of time in a menu, such as, for example, 5 minutes or some other suitable time limit, or whether the user caused a skip based on input before proceeding. DM module 106 may then determine that the user is an expert user if the user did not backtrack, did not spend an unusual amount of time in a menu, and caused a skip. If DM module 106 determines that the user is not an expert (a non-expert), then DM module 106 may inform SLG module 108 to send text to TTS module 110 to provide a tutorial to the user (act 422). For, example, if DM module 106 determines that the user should receive a tutorial based on sending a next day international package, the DM module 106 may inform SLG module 108 to generate appropriate text to TTS module 110, which may generate a verbal tutorial for the user. The tutorial may be of a form such as, for example, "next time you wish to" <perform action> "simply say" <keyword> or <key phrase>.

If, at act 406, DM module 106 determines that the response is not a response for the current menu, the DM module 106 may determine whether the input includes a keyword or key phrase for another one of the menus or a final action (act 414). If DM module 106 determines that the input does include a keyword or key phrase for another one of the menus or a final action, the DM module 106 may perform a skip to the other menu or may prepare to perform the final action (act 416). DM module may then perform act 408.

If, at act 414, DM module 106 determines that the input does not match a keyword or key phrase of any menu, then DM module 106, in cooperation with SLG module 108 and TTS module 110, may prompt and receive from the user more information (act 418). For example, the user may be prompted with "do you wish to send a package", do you wish to check your account", etc. After receiving additional information, DM module 106 may then determine whether the additional information can be used to match the response to one of the menus (act 416).

Conclusion

The above-described embodiments are exemplary and are not limiting with respect to the scope of the invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, a natural speech module may be used in implementations instead of a TTS module. In such a system, the natural speech module may play a recorded announcement to a user. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method comprising:
   determining, via a processor, whether a voice input relates to expected input of any one of a plurality of menus different from a current menu, wherein the plurality of menus different from the current menu comprises menus at a plurality of hierarchical levels;
   when the voice input relates to the expected input skipping to the one of the plurality of menus; and
   when the voice input does not relate to the expected input:
      retrieving a dynamic record associated with a user, wherein the dynamic record comprises menu traversal tracks, backtracking, and an amount of time spent in a menu;
      identifying the voice input as from one of an expert and a non-expert based on the dynamic record; and
      when the voice input is from the non-expert, providing a tutorial describing how to skip to one of the plurality of menus.

2. The method of claim 1, further comprising:
   using a single grammar with respect to all voice inputs for all menus in the plurality of menus.

3. The method of claim 1, further comprising:
   informing the user what to say to cause a menu skip when the voice input relates to expected input of multiple menus in the plurality of menus.

4. The method of claim 1, wherein determining whether the voice input relates to the expected input further comprises:
   recognizing one of a key phrase and a keyword in the voice input; and
   matching the one of the key phrase and the keyword to the one of the plurality of menus different from the current menu.

5. The method of claim 4, wherein each of the plurality of menus has one of an associated key phrase and an associated keyword that is non-overlapping with respective key phrases and keywords of other menus in the plurality of menus.

6. The method of claim 1, wherein determining whether the voice input relates to expected input further comprises:
   recognizing a portion of a key phrase associated with a menu other than the current menu; and
   prompting the user for additional information.

7. The method of claim 1, wherein determining whether the voice input relates to expected input further comprises:
   determining that the voice input comprises a conversational correction.

8. A system comprising:
   a processor; and
   a computer-readable storage medium having instructions stored which, when executed by the processor, cause the processor to perform a method comprising:
      determining whether a voice input relates to expected input of any one of a plurality of menus different from a current menu, wherein the plurality of menus different from the current menu comprises menus at a plurality of hierarchical levels;
      when the voice input relates to the expected input skipping to the one of the plurality of menus different from the current menu; and
      when the voice input does not relate to the expected input:
         retrieving a dynamic record associated with a user, wherein the dynamic record comprises menu traversal tracks, backtracking, and an amount of time spent in a menu;
         identifying the voice input as from one of an expert and a non-expert based on the dynamic record; and when the voice input is from the non-expert providing a tutorial describing how to skip to one of the plurality of menus.

9. The system of claim 8, the computer-readable storage medium having additional instructions stored which result in the method further comprising:
using a single grammar with respect to all voice inputs for all menus in the plurality of menus.

10. The system of claim 8, wherein determining whether the voice input relates to expected input further comprises:
recognizing one of a key phrase and a keyword in the voice input; and
matching the one of the key phrase and the keyword to the one of the plurality of menus.

11. The system of claim 10, wherein:
each menu of the plurality of menus has one of an associated key phrase and a keyword that is non-overlapping with a respective one of a key phrase and a keyword of other menus of the plurality of menus.

12. The system of claim 8, wherein determining whether the voice input relates to expected input further comprises:
recognizing a portion of a key phrase associated with the one of the plurality of menus other than the current menu; and
prompting for additional information.

13. The system of claim 8, wherein determining whether the voice input relates to expected input further comprises:
determining that the voice input comprises a conversational correction.

14. A non-transitory computer-readable storage device having instructions stored to control a processor to perform a method comprising:
determining whether a voice input relates to expected input of any one of a plurality of menus different from a current menu, wherein the plurality of menus different from the current menu comprises menus at a plurality of hierarchical levels;
when the voice input relates to the expected input, skipping to the one of the plurality of menus; and
when the voice input does not relate to the expected input:
retrieving a dynamic record associated with a user, wherein the dynamic record comprises menu traversal tracks, backtracking, and an amount of time spent in a menu;
identifying the voice input as from one of an expert and a non-expert based on the dynamic record; and
when the voice input is from the non-expert, providing a tutorial to the non-expert describing how to skip to one of the plurality of menus.

15. The non-transitory computer-readable storage device of claim 14, the non-transitory computer-readable storage medium having additional instruction stored which result in the method further comprising:
using a single grammar with respect to the voice input for all menus in the plurality of menus.

16. The non-transitory computer-readable storage device of claim 14, wherein determining whether the voice input relates to expected input further comprises:
recognizing one of a key phrase and a keyword in the voice input; and
matching the one of the key phrase and the keyword to the one of the plurality of menus.

17. The non-transitory computer-readable storage device of claim 16, wherein
each menu of the plurality of menus has a respective associated one of a key phrase and a keyword that is non-overlapping with one of a respective key phrase and a keyword of other menus of the plurality of menus.

18. The non-transitory computer-readable storage device of claim 14, wherein determining whether the voice input relates to expected input further comprises:
recognizing a portion of a key phrase associated with the one of the plurality of menus other than the current menu; and
prompting for additional information.

19. The non-transitory computer-readable storage device of claim 14, wherein determining whether the voice input relates to expected input further comprises:
determining that the voice input comprises a conversational correction.

20. A processing device comprising:
means for determining, via a processor, whether a voice input relates to expected input, at least partially, of any one of a plurality of menus different from a current menu, wherein the plurality of menus different from the current menu comprises menus at a plurality of hierarchical levels;
means for skipping, when the voice input relates to the expected input, to the one of the plurality of menus different from the current; and
means for, when the voice input does not relate to the expected input:
retrieving a dynamic record associated with a user, wherein the dynamic record comprises menu traversal tracks, backtracking, and an amount of time spent in a menu;
identifying the voice input as one of an expert and a non-expert based on the dynamic record; and
when the voice input is from the non-expert, providing a tutorial to the non-expert describing how to skip to one of the plurality of menus.

* * * * *